(12) United States Patent
Zhang et al.

(10) Patent No.: US 11,518,027 B2
(45) Date of Patent: Dec. 6, 2022

(54) SYSTEM AND METHOD FOR ROBOTIC ASSEMBLY

(71) Applicant: ABB Schweiz AG, Baden (CH)

(72) Inventors: Biao Zhang, West Hartford, CT (US);
Saumya Sharma, Hartford, CT (US);
Yixin Liu, New Britain, CT (US);
Jianjun Wang, ZhenjiangJiangsu (CN);
Will Eakins, Coventry, CT (US);
Andrew M. Salm, West Hartford, CT (US);
Yun Hsuan Su, Hartford, CT (US);
Jorge Vidal-Ribas, Sant Cugat del Valles (ES);
Jordi Artigas, Barcelona (ES);
Ramon Casanelles, Sant Cugat del Valles (ES)

(73) Assignee: ABB Schweiz AG, Baden (CH)

( * ) Notice: Subject to any disclaimer, the term of this patent is extended or adjusted under 35 U.S.C. 154(b) by 201 days.

(21) Appl. No.: 16/864,804

(22) Filed: May 1, 2020

(65) Prior Publication Data
US 2021/0339387 A1 Nov. 4, 2021

(51) Int. Cl.
B25J 9/16 (2006.01)
B25J 13/08 (2006.01)
B25J 19/04 (2006.01)

(52) U.S. Cl.
CPC ............. *B25J 9/1638* (2013.01); *B25J 9/162* (2013.01); *B25J 9/1687* (2013.01); *B25J 9/1697* (2013.01); *B25J 13/088* (2013.01); *B25J 19/04* (2013.01)

(58) Field of Classification Search
CPC ........ B25J 9/1638; B25J 9/162; B25J 9/1687; B25J 9/1697; B25J 13/088; B25J 19/04; B25J 9/1694; G05B 2219/37388; G05B 2219/39102; G05B 2219/40033; G05B 2219/40252; G05B 2219/40582; G05B 2219/41117; G05B 19/4182; Y02P 90/02
See application file for complete search history.

(56) References Cited

U.S. PATENT DOCUMENTS

| | | |
|---|---|---|
| 2002/0072825 A1 | 6/2002 | Angel |
| 2005/0075757 A1 | 4/2005 | Haas et al. |
| 2006/0111810 A1 | 5/2006 | Kim et al. |
| 2008/0314938 A1 | 12/2008 | Ebner et al. |
| 2010/0018339 A1 | 1/2010 | Aiken |
| 2010/0217437 A1 | 8/2010 | Sarh et al. |
| 2011/0004343 A1 | 1/2011 | Iida |
| 2011/0087360 A1* | 4/2011 | Chen ...................... B25J 9/1697 700/114 |
| 2012/0216384 A1 | 8/2012 | Immekus |
| 2013/0158709 A1* | 6/2013 | Shi ............................ B25J 5/02 700/259 |
| 2015/0100162 A1 | 4/2015 | Lin et al. |
| 2017/0010674 A1* | 1/2017 | Ide ....................... H04B 13/005 |

(Continued)

Primary Examiner — Dale Moyer
(74) Attorney, Agent, or Firm — Leydig, Voit & Mayer, Ltd.

(57) ABSTRACT

A robotic system is provided for assembling parts together. In the assembly process, both parts are moving separately with one part moving on an assembly base and another part moving on a moveable arm of a robot base. Motion data is measured by an inertial measurement unit (IMU) sensor. Movement of the robot base or moveable arm is then compensated based on the measured motion to align the first and second parts with each other and assemble the parts together.

21 Claims, 4 Drawing Sheets

(56) References Cited

U.S. PATENT DOCUMENTS

2017/0151664 A1* 6/2017 Makino .................... B25J 5/02
2018/0311820 A1 11/2018 Fritz et al.
2018/0339867 A1 11/2018 Hasegawa et al.

* cited by examiner

SYSTEM AND METHOD FOR ROBOTIC ASSEMBLY

FIELD OF INVENTION

The present invention relates to robotic calibration and control system tuning, and more particularly, to a system and method for use of robotic assembly systems involving a moving robot base and moving assembly base.

BACKGROUND

A variety of operations can be performed during the final trim and assembly (FTA) stage of automotive assembly, including, for example, door assembly, cockpit assembly, and seat assembly, among other types of assemblies. Yet, for a variety of reasons, only a relatively small number of FTA tasks are typically automated. For example, often during the FTA stage, while an operator is performing an FTA operation, the vehicle(s) undergoing FTA is/are being transported on a line(s) that is/are moving the vehicle(s) in a relatively continuous manner. Yet such continuous motions of the vehicle(s) can cause or create certain irregularities with respect to at least the movement and/or position of the vehicle(s), and/or the portions of the vehicle(s) that are involved in the FTA. Moreover, such motion can cause the vehicle to be subjected to movement irregularities, vibrations, and balancing issues during FTA, which can prevent, or be adverse to, the ability to accurately model or predict the location of a particular part, portion, or area of the vehicle directly involved in the FTA. Further, such movement irregularities can prevent the FTA from having a consistent degree of repeatability in terms of the movement and/or positioning of each vehicle, or its associated component, as each subsequent vehicle and/or component passes along the same area of the assembly line. Accordingly, such variances and concerns regarding repeatability can often preclude the use of traditional teach and repeat position based robot motion control in FTA operations.

Accordingly, although various robot control systems are available currently in the marketplace, further improvements are possible to provide a system and means to calibrate and tune the robot control system to accommodate such movement irregularities.

BRIEF SUMMARY

A robotic system is described for assembling parts together as a first part is moving with an assembly base and a second part is moving with a robot base. Motion data is measured by an inertial measurement unit (IMU) sensor. Movement of the robot base or moveable arm is then compensated based on the measured motion to align the first and second parts with each other and assemble the parts together. These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

Figure 1:
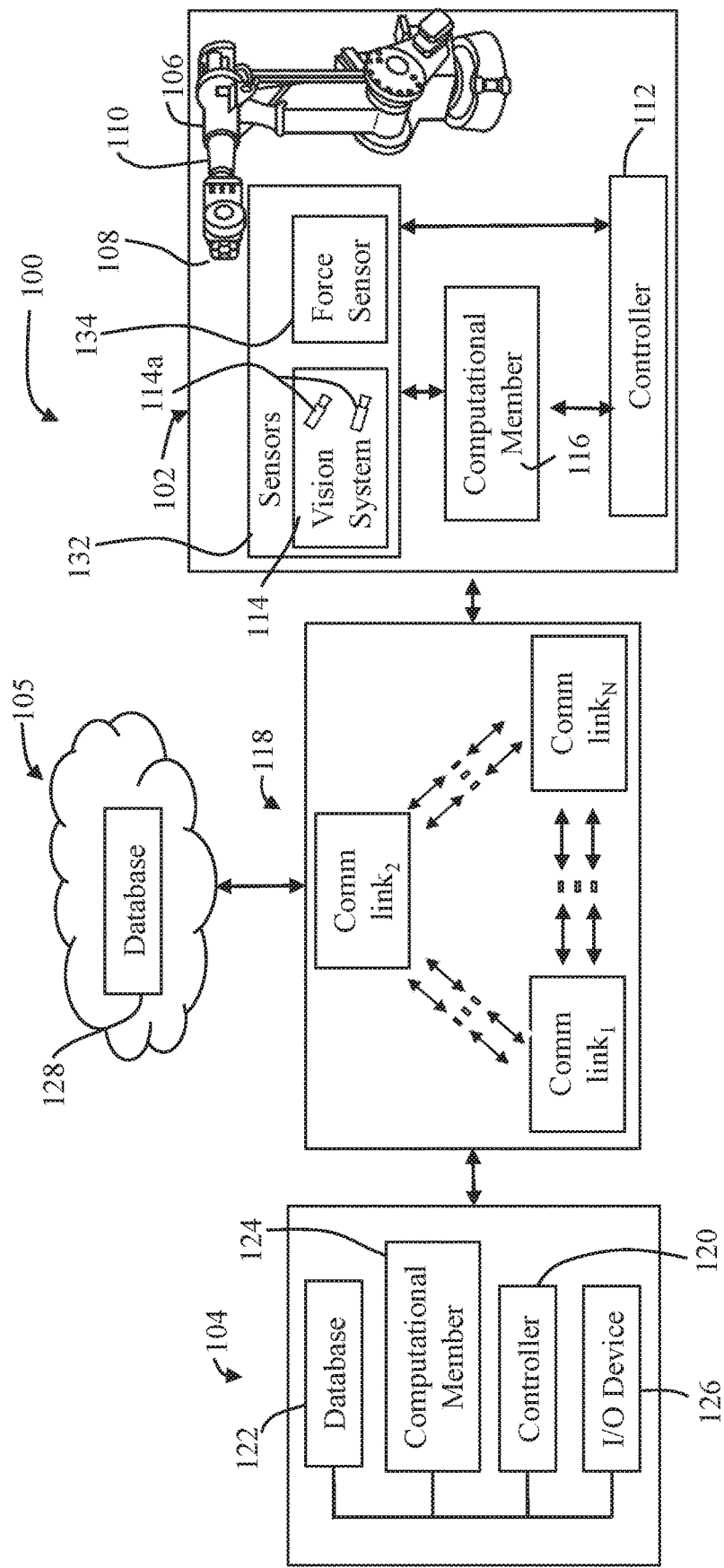
FIG. 1 illustrates a schematic representation of at least a portion of an exemplary robotic system according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates at least a portion of an exemplary robotic system 100 that includes at least one robot station 102 that is communicatively coupled to at least one management system 104, such as, for example, via a communication network or link 118. The management system 104 can be local or remote relative to the robot station 102. Further, according to certain embodiments, the management system 104 can be cloud based. Further, according to certain embodiments, the robot station 102 can also include, or be in operable communication with, one or more supplemental database systems 105 via the communication network or link 118. The supplemental database system(s) 105 can have a variety of different configurations. For example, according to the illustrated embodiment, the supplemental database system(s) 105 can be, but is not limited to, a cloud based database.

According to certain embodiments, the robot station 102 includes one or more robots 106 having one or more degrees of freedom. For example, according to certain embodiments, the robot 106 can have, for example, six degrees of freedom. According to certain embodiments, an end effector 108 can be coupled or mounted to the robot 106. The end effector 108 can be a tool, part, and/or component that is mounted to a wrist or arm 110 of the robot 106. Further, at least portions of the wrist or arm 110 and/or the end effector 108 can be moveable relative to other portions of the robot 106 via operation of the robot 106 and/or the end effector 108, such for, example, by an operator of the management system 104 and/or by programming that is executed to operate the robot 106.

The robot 106 can be operative to position and/or orient the end effector 108 at locations within the reach of a work envelope or workspace of the robot 106, which can accommodate the robot 106 in utilizing the end effector 108 to perform work, including, for example, grasp and hold one or more components, parts, packages, apparatuses, assemblies, or products, among other items (collectively referred to herein as "components"). A variety of different types of end effectors 108 can be utilized by the robot 106, including, for example, a tool that can grab, grasp, or otherwise selectively hold and release a component that is utilized in a final trim and assembly (FTA) operation during assembly of a vehicle, among other types of operations.

Figure 2:
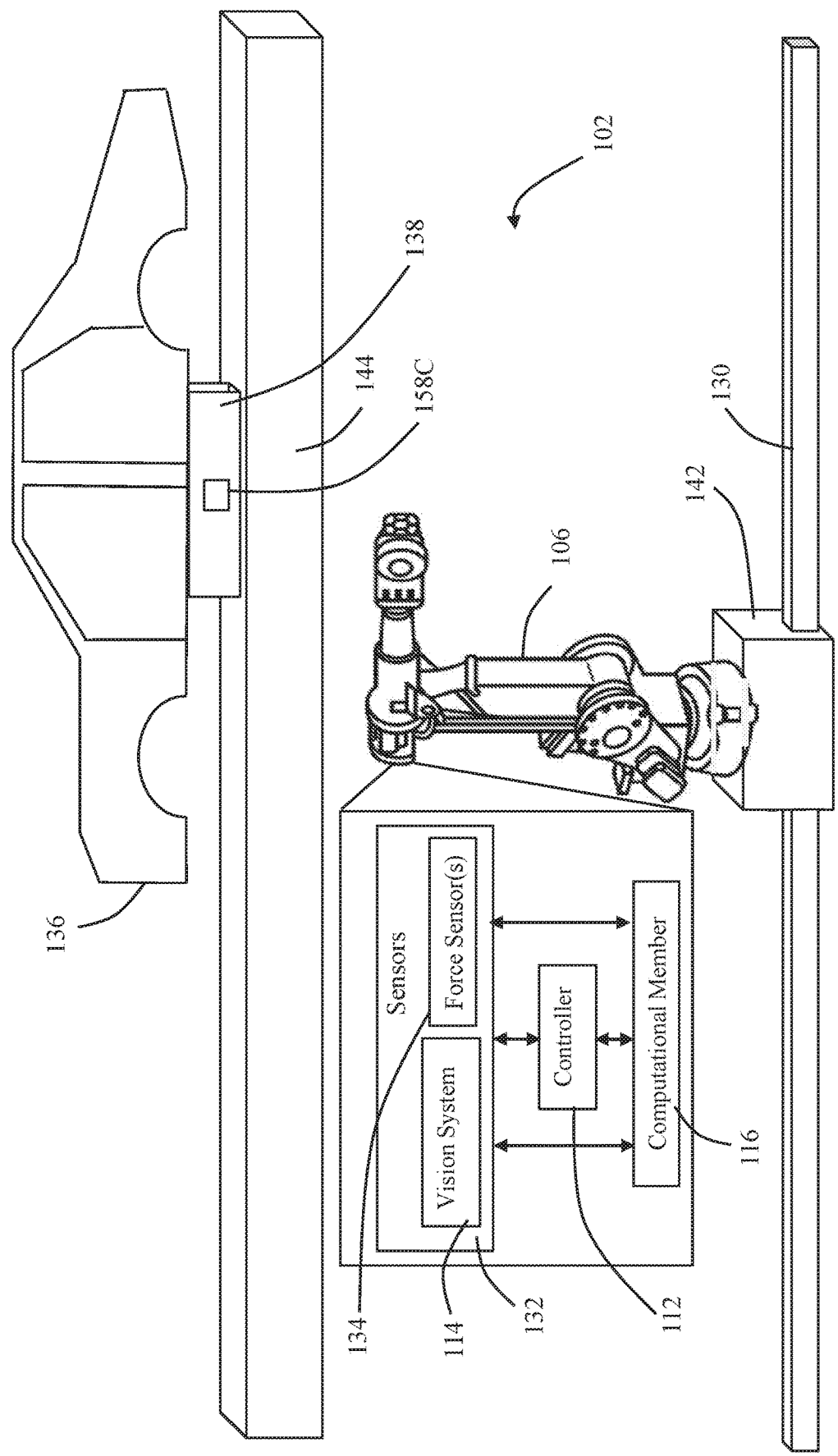
FIG. 2 illustrates a schematic representation of an exemplary robot station through which vehicles are moved through by an automated or automatic guided vehicle (AGV), and which includes a robot that is mounted to a robot base that is moveable along, or by, a track.

The robot 106 can include, or be electrically coupled to, one or more robotic controllers 112. For example, according to certain embodiments, the robot 106 can include and/or be electrically coupled to one or more controllers 112 that may, or may not, be discrete processing units, such as, for example, a single controller or any number of controllers. The controller 112 can be configured to provide a variety of functions, including, for example, be utilized in the selective delivery of electrical power to the robot 106, control of the movement and/or operations of the robot 106, and/or control the operation of other equipment that is mounted to the robot 106, including, for example, the end effector 108, and/or the operation of equipment not mounted to the robot 106 but which are an integral to the operation of the robot 106 and/or to equipment that is associated with the operation and/or movement of the robot 106. Moreover, according to certain embodiments, the controller 112 can be configured to dynamically control the movement of both the robot 106 itself, as well as the movement of other devices to which the robot 106 is mounted or coupled, including, for example, among other devices, movement of the robot 106 along, or, alternatively, by, a track 130 or mobile platform such as the AGV to which the robot 106 is mounted via a robot base 142, as shown in FIG. 2.

The controller 112 can take a variety of different forms, and can be configured to execute program instructions to perform tasks associated with operating the robot 106, including to operate the robot 106 to perform various functions, such as, for example, but not limited to, the tasks described herein, among other tasks. In one form, the controller(s) 112 is/are microprocessor based and the program instructions are in the form of software stored in one or more memories. Alternatively, one or more of the controllers 112 and the program instructions executed thereby can be in the form of any combination of software, firmware and hardware, including state machines, and can reflect the output of discreet devices and/or integrated circuits, which may be co-located at a particular location or distributed across more than one location, including any digital and/or analog devices configured to achieve the same or similar results as a processor-based controller executing software or firmware based instructions. Operations, instructions, and/or commands determined and/or transmitted from the controller 112 can be based on one or more models stored in non-transient computer readable media in a controller 112, other computer, and/or memory that is accessible or in electrical communication with the controller 112.

According to the illustrated embodiment, the controller 112 includes a data interface that can accept motion commands and provide actual motion data. For example, according to certain embodiments, the controller 112 can be communicatively coupled to a pendant, such as, for example, a teach pendant, that can be used to control at least certain operations of the robot 106 and/or the end effector 108.

The robot station 102 and/or the robot 106 can also include one or more sensors 132. The sensors 132 can include a variety of different types of sensors and/or combinations of different types of sensors, including, but not limited to, a vision system 114, force sensors 134, motion sensors, acceleration sensors, and/or depth sensors, among other types of sensors. Further, information provided by at least some of these sensors 132 can be integrated, including, for example, via use of algorithms, such that operations and/or movement, among other tasks, by the robot 106 can at least be guided via sensor fusion. Thus, as shown by at least FIGS. 1 and 2, information provided by the one or more sensors 132, such as, for example, a vision system 114 and force sensors 134, among other sensors 132, can be processed by a controller 120 and/or a computational member 124 of a management system 104 such that the information provided by the different sensors 132 can be combined or integrated in a manner that can reduce the degree of uncertainty in the movement and/or performance of tasks by the robot 106.

According to the illustrated embodiment, the vision system 114 can comprise one or more vision devices 114a that can be used in connection with observing at least portions of the robot station 102, including, but not limited to, observing, parts, component, and/or vehicles, among other devices or components that can be positioned in, or are moving through or by at least a portion of, the robot station 102. For example, according to certain embodiments, the vision system 114 can extract information for a various types of visual features that are positioned or placed in the robot station 102, such, for example, on a vehicle and/or on automated guided vehicle (AGV) that is moving the vehicle through the robot station 102, among other locations, and use such information, among other information, to at least assist in guiding the movement of the robot 106, movement of the robot 106 along a track 130 or mobile platform such as the AGV (FIG. 2) in the robot station 102, and/or movement of an end effector 108. Further, according to certain embodiments, the vision system 114 can be configured to attain and/or provide information regarding at a position, location, and/or orientation of one or more calibration features that can be used to calibrate the sensors 132 of the robot 106.

According to certain embodiments, the vision system 114 can have data processing capabilities that can process data or information obtained from the vision devices 114a that can be communicated to the controller 112. Alternatively, according to certain embodiments, the vision system 114 may not have data processing capabilities. Instead, according to certain embodiments, the vision system 114 can be electrically coupled to a computational member 116 of the robot station 102 that is adapted to process data or information outputted from the vision system 114. Additionally, according to certain embodiments, the vision system 114 can be operably coupled to a communication network or link 118, such that information outputted by the vision system 114 can be processed by a controller 120 and/or a computational member 124 of a management system 104, as discussed below.

Examples of vision devices 114a of the vision system 114 can include, but are not limited to, one or more imaging capturing devices, such as, for example, one or more two-dimensional, three-dimensional, and/or RGB cameras that can be mounted within the robot station 102, including, for example, mounted generally above the working area of the robot 106, mounted to the robot 106, and/or on the end effector 108 of the robot 106, among other locations. Further, according to certain embodiments, the vision system 114 can be a position based or image based vision system. Additionally, according to certain embodiments, the vision system 114 can utilize kinematic control or dynamic control.

According to the illustrated embodiment, in addition to the vision system 114, the sensors 132 also include one or more force sensors 134. The force sensors 134 can, for example, be configured to sense contact force(s) during the assembly process, such as, for example, a contact force between the robot 106, the end effector 108, and/or a component being held by the robot 106 with the vehicle 136 and/or other component or structure within the robot station 102. Such information from the force sensor(s) 134 can be combined or integrated with information provided by the vision system 114 such that movement of the robot 106 during assembly of the vehicle 136 is guided at least in part by sensor fusion.

According to the exemplary embodiment depicted in FIG. 1, the management system 104 can include at least one controller 120, a database 122, the computational member 124, and/or one or more input/output (I/O) devices 126. According to certain embodiments, the management system 104 can be configured to provide an operator direct control of the robot 106, as well as to provide at least certain programming or other information to the robot station 102 and/or for the operation of the robot 106. Moreover, the management system 104 can be structured to receive commands or other input information from an operator of the robot station 102 or of the management system 104, including, for example, via commands generated via operation or selective engagement of/with an input/output device 126. Such commands via use of the input/output device 126 can include, but is not limited to, commands provided through the engagement or use of a microphone, keyboard, touch screen, joystick, stylus-type device, and/or a sensing device that can be operated, manipulated, and/or moved by the operator, among other input/output devices. Further, according to certain embodiments, the input/output device 126 can include one or more monitors and/or displays that can provide information to the operator, including, for, example, information relating to commands or instructions provided by the operator of the management system 104, received/transmitted from/to the supplemental database system(s) 105 and/or the robot station 102, and/or notifications generated while the robot 106 is running (or attempting to run) a program or process. For example, according to certain embodiments, the input/output device 126 can display images, whether actual or virtual, as obtained, for example, via use of at least the vision device 114a of the vision system 114.

According to certain embodiments, the management system 104 can include any type of computing device having a controller 120, such as, for example, a laptop, desktop computer, personal computer, programmable logic controller (PLC), or a mobile electronic device, among other computing devices, that includes a memory and a processor sufficient in size and operation to store and manipulate a database 122 and one or more applications for at least communicating with the robot station 102 via the communication network or link 118. In certain embodiments, the management system 104 can include a connecting device that may communicate with the communication network or link 118 and/or robot station 102 via an Ethernet WAN/LAN connection, among other types of connections. In certain other embodiments, the management system 104 can include a web server, or web portal, and can use the communication network or link 118 to communicate with the robot station 102 and/or the supplemental database system(s) 105 via the internet.

The management system 104 can be located at a variety of locations relative to the robot station 102. For example, the management system 104 can be in the same area as the robot station 102, the same room, a neighboring room, same building, same plant location, or, alternatively, at a remote location, relative to the robot station 102. Similarly, the supplemental database system(s) 105, if any, can also be located at a variety of locations relative to the robot station 102 and/or relative to the management system 104. Thus, the communication network or link 118 can be structured, at least in part, based on the physical distances, if any, between the locations of the robot station 102, management system 104, and/or supplemental database system(s) 105. According to the illustrated embodiment, the communication network or link 118 comprises one or more communication links 118 (Comm link$_{1-N}$ in FIG. 1). Additionally, the system 100 can be operated to maintain a relatively reliable real-time communication link, via use of the communication network or link 118, between the robot station 102, management system 104, and/or supplemental database system(s) 105. Thus, according to certain embodiments, the system 100 can change parameters of the communication link 118, including, for example, the selection of the utilized communication links 118, based on the currently available data rate and/or transmission time of the communication links 118.

The communication network or link 118 can be structured in a variety of different manners. For example, the communication network or link 118 between the robot station 102, management system 104, and/or supplemental database system(s) 105 can be realized through the use of one or more of a variety of different types of communication technologies, including, but not limited to, via the use of fiber-optic, radio, cable, or wireless based technologies on similar or different types and layers of data protocols. For example, according to certain embodiments, the communication network or link 118 can utilize an Ethernet installation(s) with wireless local area network (WLAN), local area network (LAN), cellular data network, Bluetooth, ZigBee, point-to-point radio systems, laser-optical systems, and/or satellite communication links, among other wireless industrial links or communication protocols.

The database 122 of the management system 104 and/or one or more databases 128 of the supplemental database system(s) 105 can include a variety of information that may be used in the identification of elements within the robot station 102 in which the robot 106 is operating. For example, as discussed below in more detail, one or more of the databases 122, 128 can include or store information that is used in the detection, interpretation, and/or deciphering of images or other information detected by a vision system 114, such as, for example, features used in connection with the calibration of the sensors 132. Additionally, or alternatively, such databases 122, 128 can include information pertaining to the one or more sensors 132, including, for example, information pertaining to forces, or a range of forces, that are to be expected to be detected by via use of the one or more force sensors 134 at one or more different locations in the robot station 102 and/or along the vehicle 136 at least as work is performed by the robot 106. Additionally, information in the databases 122, 128 can also include information used to at least initially calibrate the one or more sensors 132, including, for example, first calibration parameters associated with first calibration features and second calibration parameters that are associated with second calibration features.

The database 122 of the management system 104 and/or one or more databases 128 of the supplemental database system(s) 105 can also include information that can assist in discerning other features within the robot station 102. For example, images that are captured by the one or more vision devices 114*a* of the vision system 114 can be used in identifying, via use of information from the database 122, FTA components within the robot station 102, including FTA components that are within a picking bin, among other components, that may be used by the robot 106 in performing FTA.

FIG. 2 illustrates a schematic representation of an exemplary robot station 102 through which vehicles 136 are moved by an automated or automatic guided vehicle (AGV) 138, and which includes a robot 106 that is mounted to a robot base 142 that is moveable along, or by, a track 130 or mobile platform such as the AGV. While for at least purposes of illustration, the exemplary robot station 102 depicted in FIG. 2 is shown as having, or being in proximity to, a vehicle 136 and associated AGV 138, the robot station 102 can have a variety of other arrangements and elements, and can be used in a variety of other manufacturing, assembly, and/or automation processes. As depicted, the AGV may travel along a track 144, or may alternatively travel along the floor on wheels or may travel along an assembly route in other known ways. Further, while the depicted robot station 102 can be associated with an initial set-up of a robot 106, the station 102 can also be associated with use of the robot 106 in an assembly and/or production process.

Additionally, while the example depicted in FIG. 2 illustrates a single robot station 102, according to other embodiments, the robot station 102 can include a plurality of robot stations 102, each station 102 having one or more robots 106. The illustrated robot station 102 can also include, or be operated in connection with, one or more AGV 138, supply lines or conveyors, induction conveyors, and/or one or more sorter conveyors. According to the illustrated embodiment, the AGV or conveyor 138 can be positioned and operated relative to the one or more robot stations 102 so as to transport, for example, vehicles 136 that can receive, or otherwise be assembled with or to include, one or more components of the vehicle(s) 136, including, for example, a door assembly, a cockpit assembly, and a seat assembly, among other types of assemblies and components. Similarly, according to the illustrated embodiment, the track 130 can be positioned and operated relative to the one or more robots 106 so as to facilitate assembly by the robot(s) 106 of components to the vehicle(s) 136 that is/are being moved via the AGV 138. Moreover, the track 130 or mobile platform such as the AGV, robot base 142, and/or robot can be operated such that the robot 106 is moved in a manner that at least generally follows of the movement of the AGV 138, and thus the movement of the vehicle(s) 136 that are on the AGV 138. Further, as previously mentioned, such movement of the robot 106 can also include movement that is guided, at least in part, by information provided by the one or more force sensor(s) 134.

Figure 3:
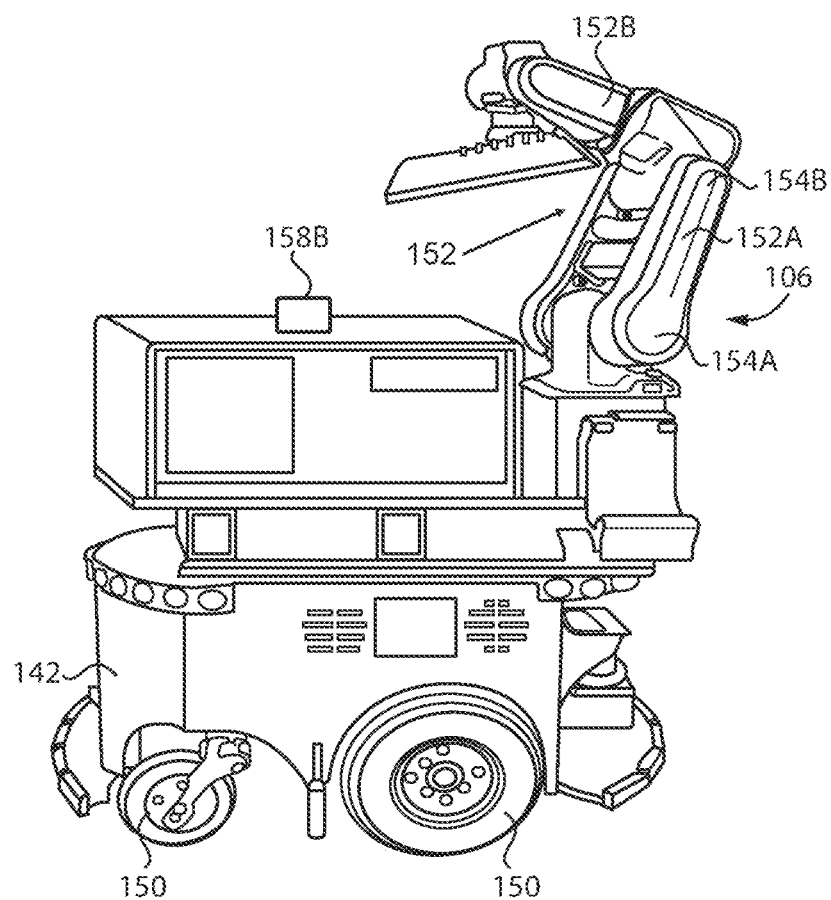
FIG. 3 illustrates a robot base with moveable arms.

FIG. 3 is another illustration of an embodiment of a robot base 142 with a robot 106 mounted thereon. In this embodiment, the robot base 142 may have wheels 150 that allow the robot base 142 to travel along the floor along the assembly line defined by the assembly base 138 (or AGV 138). The robot 106 has at least one movable arm 152 that may move relative to the robot base 142, although it is preferable for the robot 106 to have multiple movable arms 152A-C linked by joints 154A-C to provide a high degree of movement flexibility.

Figure 4:
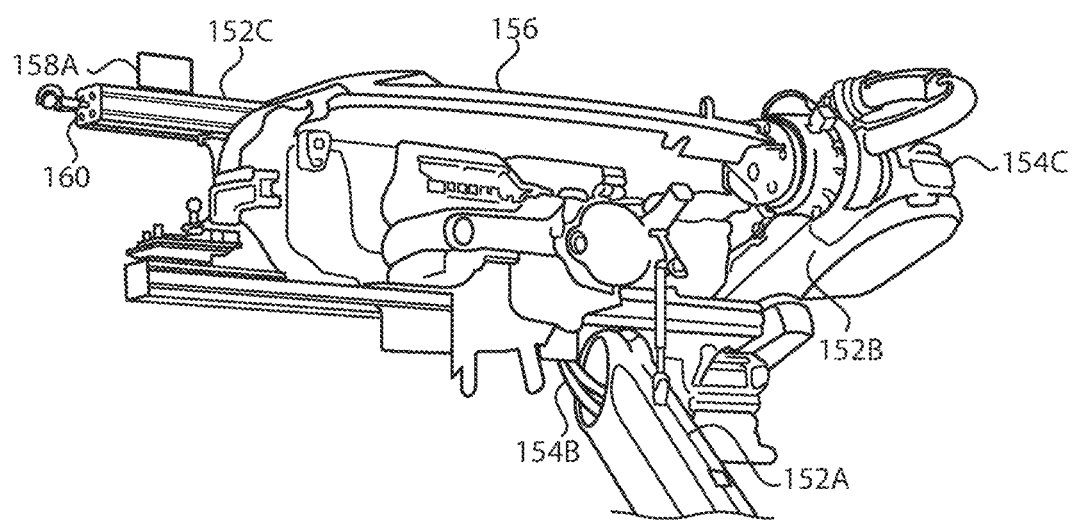
FIG. 4 illustrates a moveable arm of a robot with an assembly part attached thereto.

As illustrated in FIG. 4, the most distal movable arm 152C may be a tool arm 152C upon which an assembly part 156, or second part 156, is mounted. For example, the assembly part 156 may be a vehicle dash assembly 156 to be installed within the interior of the vehicle 136, or first part 136. In this case, as illustrated, the tool arm 152C must be long and extends significantly beyond the other movable arms 152A-B of the robot 106. The dash assembly 156 is also moderately heavy. This can cause problems with robotic assembly of vehicle parts 136, 156 especially when the assembly base 138 and the robot base 142 are both moving as the movable arm 152C is moved to align the second part 156 (e.g., dash assembly 156) with the first part 136 (e.g., vehicle body 136) to assemble the two parts 136, 156 together. For example, the dash assembly 156 may be vibrating due to flexing in the movable arms 152A-C and the movement of the robot base 142. Likewise, the vehicle body 136 may also be vibrating or otherwise varying in position due to movement of the assembly base 138. It is understood that the assembly parts 136, 156 described here are only examples and other assembly parts may also be assembled as described herein, such as vehicle doors and various vehicle trim parts.

In order to control movement of the movable arms 152 of the robot 106 relative to the vehicle body 136 on the assembly base 138 as the assembly base 138 and the robot base 142 are both moving, it may be desirable to mount an inertial measurement unit (IMU) sensor 158A-C on the assembly base 138, the robot base 142 or one of the movable arms 152A-C. The IMU sensor may be an accelerometer, gyroscope, magnetometer or other known sensor capable of measuring changes in motion. Ideally, IMU sensors 158A-B are mounted on both the robot base 142 and on a movable arm 152 of the robot 106. Preferably, the IMU sensor 158A on the movable arm 152 is mounted on the most distal movable arm 152C, or on the movable arm 152C upon which the assembly part 156 is mounted. Even more preferably, the IMU sensor 158A on the movable arm 152C is located near the end of the movable arm 152C away from the nearest joint 154C, i.e., closer to the distal end 160 than to the joint 154C. Most ideally, IMU sensors 158A-C are mounted on the robot base 142, a movable arm 152 and the assembly base 138.

Figure 5:
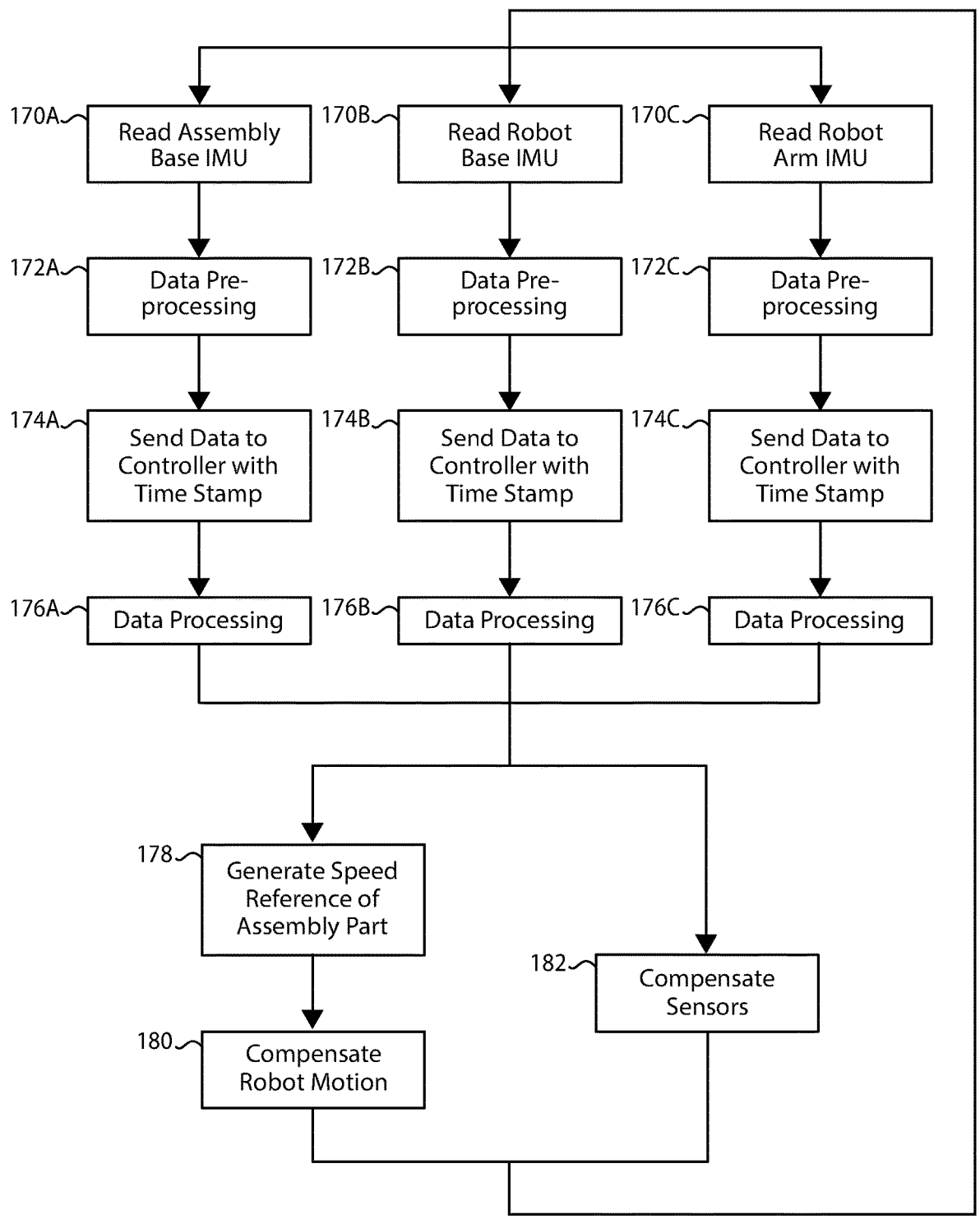
FIG. 5 illustrates a flow chart for assembling two parts together on a moving assembly line.

An embodiment of a process for controlling robot 106 movement to assemble two parts 136, 156 together while both the robot 106 and the assembly base 138 are moving is illustrated in FIG. 5. As shown, the motion of the assembly base 138, robot base 142 and/or movable robot arm 152 is initially measured with one or more IMU sensors 158 mounted on the respective components (170A-C). As noted, it may be most desirable for an IMU sensor 158A-C to be mounted on each of the assembly base 138, robot base 142 and movable arm 152C and motion measurements to be collected from each component. However, it is understood that the process could be implemented by collecting motion measurements from a single component or only two components if desired.

The measured motion data may then be pre-processed to remove noise from the data received from the IMU sensor(s) 158A-C (172A-C). This may be advantageous to smooth out the motion data. The motion data is also preferably time-stamped, and the smoothed, time-stamped data may then be transmitted to the robot controller 112 (174A-C). The robot controller 112 may then process the motion data further to determine properties of the assembly base 138, robot base 142 and/or movable arm 152 associated with movement of the respective components, such as the current position, speed and/or acceleration of the respective component (176A-C). The robot controller 112 may then use the determined properties or the motion data directly to generate a reference speed for the vehicle body 136 and/or the assembly part 156 on the robot movable arm 152C (178). The speed reference(s) may then be used to compensate movement of the robot movable arms 152A-C in order to align the assembly part 156 to the vehicle part 136 while both are moving to assemble the assembly part 156 to the vehicle body 136 (180). Other sensors used by the robotic system may also be compensated based on the motion data, such as robotic vision systems 114, force sensors 134, etc. (182).

Retrieving the measured motion data from the IMU sensors 158 may be used in various ways to compensate movement of the robot base 142 and/or movable arm 152 to align the assembly part 156 with the vehicle 136 to assemble the two together. For example, vibrations in any part of the system (e.g., assembly base 138, vehicle 136, robot base 142, movable arms 152 and/or assembly part 156) may cause misalignment between the assembly part 156 and the vehicle 136. However, with the robot controller 112 receiving the measured motion data, movement of the robot base 142 and/or movable arms 152 may be compensated to account for vibration or other movements in the system. For example, it may be desirable to compensate movement of the robot base 142 or movable arms 152 in response to vibrations or other movements sensed from the IMU sensor 158C on the assembly base 138 (e.g., caused by movement of the assembly base 138 and which would be representative of movement variations of the vehicle 136). It may also be desirable to compensate movement of the movable arms 152 in response to vibrations or other movements sensed from the IMU sensor 158B on the robot base 142 (e.g., caused by roughness of the floor or wheels 150 or changes in speed). It may also be desirable to compensate movement of the movable arms 152, especially the tool arm 152C, in response to vibrations or other movements sensed from the IMU sensor 158A on the movable arm 152 (e.g., caused by flexibility in the movable arms 152 and movement of the robot base 142 and movable arms 152).

In addition to compensating for vibrations of the various components, compensations of the robot base 142 or movable arms 152 may be in response to changes in position, speed or acceleration of the assembly base 138, robot base 142 and/or movable arm 152. For example, the position and speed of the assembly base 138 may be used by the controller 112 to compensate movement of the robot base 142 to match the speed and position of the assembly base 138. The position and speed of the robot base 142 may also be compensated based on the IMU sensor 158B data to match actual position and speed of the robot base 142 with the expected position and speed. The position of the assembly base 138 as determined from the IMU sensor 158C mounted thereon may also be used to compensate movement of the robot base 142 by moving the robot base 142 before the vehicle 136 has entered the field of view of a camera 114 mounted on the robot 106. This allows the robot base 142 to accelerate and match speed with the assembly base 138 before the assembly base 138 is in a position where the robot 106 can assemble the assembly part 156 to the vehicle 136. Once the vehicle 136 enters the field of view of the robot camera 114, the controller 112 may then move the movable arms 152 in response to the camera 114.

It is also possible for the measured motion data to be used to test the functioning of the system components (e.g., assembly base 138, vehicle 136, robot base 142, movable arms 152 and/or assembly part 156) and the IMU sensors 158 themselves. For example, in the case of the IMU sensor 158A on the tool arm 152C, it may be desirable for vibration data to be collected during testing based on known accelerations or other movement sequences. During operation, the controller 112 may then compare actual vibrations with the stored expected vibrations. When the actual and expected vibrations vary by more than a threshold amount, it may be determined that there is a failure in the robot base 142, movable arms 152, joints 154, assembly part 156 or IMU sensor 158A.

As described above, the measured motion data from the IMU sensors 158 is preferably time-stamped. Although this may occur at the robot controller 112, it is more preferable that this occur at the IMU sensor 158 before the data is transmitted to the controller 112. Time-stamping of the data is particularly important where IMU sensors 158 are used on multiple components to determine compensations. Thus, when the controller 112 determines compensations based on measured motion data from two or more IMU sensors 158, the time stamps of the different motion data are matched by the controller 112 before determining compensations based thereon.

Additionally, tool vibration characteristics may also be obtained using mechanical model analysis based simulation. For example, the simulation may be based upon the tool's dimensions, weight, mechanical properties (e.g., stiffness, etc.), payload and robot arm motion characteristics (e.g., speed, acceleration, etc.). As a result, when the robot accelerates or decelerates the moveable arm, the vibration of the moveable arm can be predicted based on the mechanical model analysis from the simulation.

Vibration characteristics may also be used to compensate the robot motion. For example, parameters of a low pass filter of the robot motion control loop may be changed to filter out vibrations. Direct feed in the robot motion control may also be used to cancel vibrations (e.g., prediction used to generate a speed reference). As a result, the predicted vibration of the tool may be used to smooth or directly compensate for vibrations.

It is also possible to compensate the robot base movement during use. For example, when the AGV approaches the robot working cell, the robot base may start tracking and match the speed of the AGV. Changes in robot motion and sensor data due to the initial acceleration may be compensated with real-time information of the AGV. During tracking, the speed of AGV may vary. With AGV tracking information, the system may change the speed of the robot base accordingly and also compensate the robot motion and sensor data that caused speed changes (acceleration/deceleration).

The speed of the robot base may also be ramped up before tracking starts by predicting the position of the AGV. Using the speed and position of the AGV, the system can predict when the AGV will approach before the AGV appears in the field of view of the camera. The robot base may then be gradually accelerated to reach a stabilized system when the AGV enters the field of view of the camera. This may reduce the acceleration during the beginning stage of tracking and avoid rush movements during tracking.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method for assembling parts, comprising:
    moving an assembly base with a first part disposed thereon along an assembly line;
    moving a robot base along the assembly line, a robot being disposed on the robot base and comprising a moveable arm, a second part being supported by the moveable arm;
    measuring a motion of the assembly base, the robot base or the moveable arm; and
    compensating movement of the robot base or moveable arm based on the measured motion to align the second part with the first part to assemble the second part to the first part while the assembly base and the robot base are moving.

2. The method according to claim 1, wherein the motion is measured with an inertial measurement unit (IMU) sensor.

3. The method according to claim 1, wherein the motion is measured with an IMU sensor connected to the assembly base to measure the motion of the assembly base.

4. The method according to claim 3, further comprising communicating the motion of the assembly base to a robot controller, wherein the robot controller moves the robot base to match a speed of the assembly base to compensate movement of the robot base to align the second part with the first part to assemble the second part to the first part.

5. The method according to claim 3, further comprising communicating the motion of the assembly base to a robot controller, wherein the robot controller moves the robot base in response to the motion of the assembly base before the first part enters a field of view of a camera disposed on the robot, the first part thereafter entering the field of view of the camera and the robot controller moving the moveable arm in response to information captured by the camera to align the second part with the first part to assemble the second part to the first part.

6. The method according to claim 3, further comprising communicating the motion of the assembly base to a robot controller, and processing the measured motion to determine a vibration of the assembly base, wherein movement of the robot base or moveable arm is compensated based on the vibration to align the second part with the first part to assemble the second part to the first part.

7. The method according to claim 1, wherein the motion is measured with an IMU sensor connected to the robot base to measure the motion of the robot base.

8. The method according to claim 7, further comprising communicating the motion of the robot base to a robot controller, wherein the robot controller compensates movement of the moveable arm based on the motion of the robot base to align the second part with the first part to assemble the second part to the first part.

9. The method according to claim 8, further comprising processing the measured motion to determine a vibration of the robot base, wherein movement of the moveable arm is compensated based on the vibration to align the second part with the first part to assemble the second part to the first part.

10. The method according to claim 1, wherein the motion is measured with an IMU sensor connected to the moveable arm to measure the motion of the moveable arm.

11. The method according to claim 10, further comprising communicating the motion of the moveable arm to a robot controller, and processing the measured motion to determine a vibration of the moveable arm, wherein the robot controller compensates movement of the moveable arm based on the vibration of the moveable arm to align the second part with the first part to assemble the second part to the first part.

12. The method according to claim 10, further comprising processing the measured motion to determine a vibration of the moveable arm, comparing the vibration to a predetermined expected vibration, and determining that the assembly part, the moveable arm or the IMU sensor has failed when the vibration and the predetermined expected vibration varies by more than a threshold.

13. The method according to claim 1, further comprising processing the measured motion in a determination of a position, speed or acceleration of the assembly base, the robot base or the moveable arm, wherein movement of the robot base or moveable arm is compensated based on the position, speed or acceleration to align the second part with the first part to assemble the second part to the first part.

14. The method according to claim 1, further comprising processing the measured motion in a determination of a vibration of the assembly base, the robot base or the moveable arm, wherein movement of the robot base or moveable arm is compensated based on the vibration to align the second part with the first part to assemble the second part to the first part.

15. The method according to claim 1, further comprising assigning a first time stamp to the measured motion, a robot controller receiving the measured motion and the first time stamp and receiving another measured motion of the assembly base, the robot base or the moveable arm from another sensor with a second time stamp assigned thereto, the robot controller matching the first time stamp and the second time stamp and compensating the measured motion based on the another measured motion.

16. The method according to claim 1, wherein the motion is measured with an IMU sensor, the IMU sensor being an accelerometer, gyroscope or magnetometer.

17. The method according to claim 1, wherein the motion is measured with an IMU sensor connected to the assembly base to measure the motion of the assembly base, and further comprising another IMU sensor connected to the robot base to measure a motion of the robot base.

18. The method according to claim 17, further comprising processing the measured motion of the robot base to determine a vibration of the robot base, wherein movement of the moveable arm is compensated based on the vibration of the robot base to align the second part with the first part to assemble the second part to the first part.

19. The method according to claim 18, further comprising processing the measured motion of the assembly base to determine a vibration of the assembly base, wherein movement of the moveable arm is compensated based on the vibrations of the assembly base and the robot base to align the second part with the first part to assemble the second part to the first part.

20. The method according to claim 19, further comprising yet another IMU sensor connected to the moveable arm to measure the motion of the moveable arm.

21. The method according to claim 20, further comprising processing the measured motion of the moveable arm to determine a vibration of the moveable arm, wherein movement of the moveable arm is compensated based on the vibrations of the assembly base, the robot base and the moveable arm to align the second part with the first part to assemble the second part to the first part.

\* \* \* \* \*